Sept. 13, 1932. H. T. MUSTONEN 1,877,683
PNEUMATIC LIFT APPARATUS
Filed April 19, 1932 2 Sheets-Sheet 1

INVENTOR
Henry T. Mustonen
BY
ATTORNEY

Sept. 13, 1932.  H. T. MUSTONEN  1,877,683
PNEUMATIC LIFT APPARATUS
Filed April 19, 1932  2 Sheets-Sheet 2

INVENTOR
Henry T. Mustonen
BY
ATTORNEY

Patented Sept. 13, 1932

1,877,683

UNITED STATES PATENT OFFICE

HENRY T. MUSTONEN, OF LITTLE NECK, NEW YORK

PNEUMATIC LIFT APPARATUS

Application filed April 19, 1932. Serial No. 606,091.

The invention relates to pneumatic lift apparatus, and more especially to the separating mechanism for withdrawing the lifted material from its fluid-carrying vehicle such as air. In the operation of apparatus of this nature, difficulty has heretofore been experienced in the air binding of the material in the hopper bottom associated with the separator apparatus; and it is an object of the present invention to avoid entirely such air binding of the material and to provide for its delivery continuously from the apparatus, as through a suitable delivery chute or the like connected therewith.

A further object of the invention resides in the provision of a novel separator mechanism whereby any chaff associated with the material, or fragments of said material, is caused to be separated from the bulk of the material passing through the separator and before its delivery from said separator.

Another object of the invention resides in the provision of a simple and effective mechanism for readily and continuously separating the material from its carrying vehicle.

In carrying out the invention, two cylinders are mounted adjacently to each other, the one cylinder being of a foraminous nature and hollow, and adapted to receive material elevated thereto which is eventually discharged to the other cylinder for removal thereby. A suction connection is made to the interior of the foraminous cylinder and a cut-off element is associated therewith for nullifying temporarily the effect of the suction in holding material upon the foraminous cylinder. Furthermore, a fan element carried by the foraminous cylinder serves to effect its rotation under the applied suction and this rotation is communicated to the other cylinder through suitable gearing.

The nature of the invention, however, will best be understood when described in connection with the accompanying drawings, in which.

Figure 1:
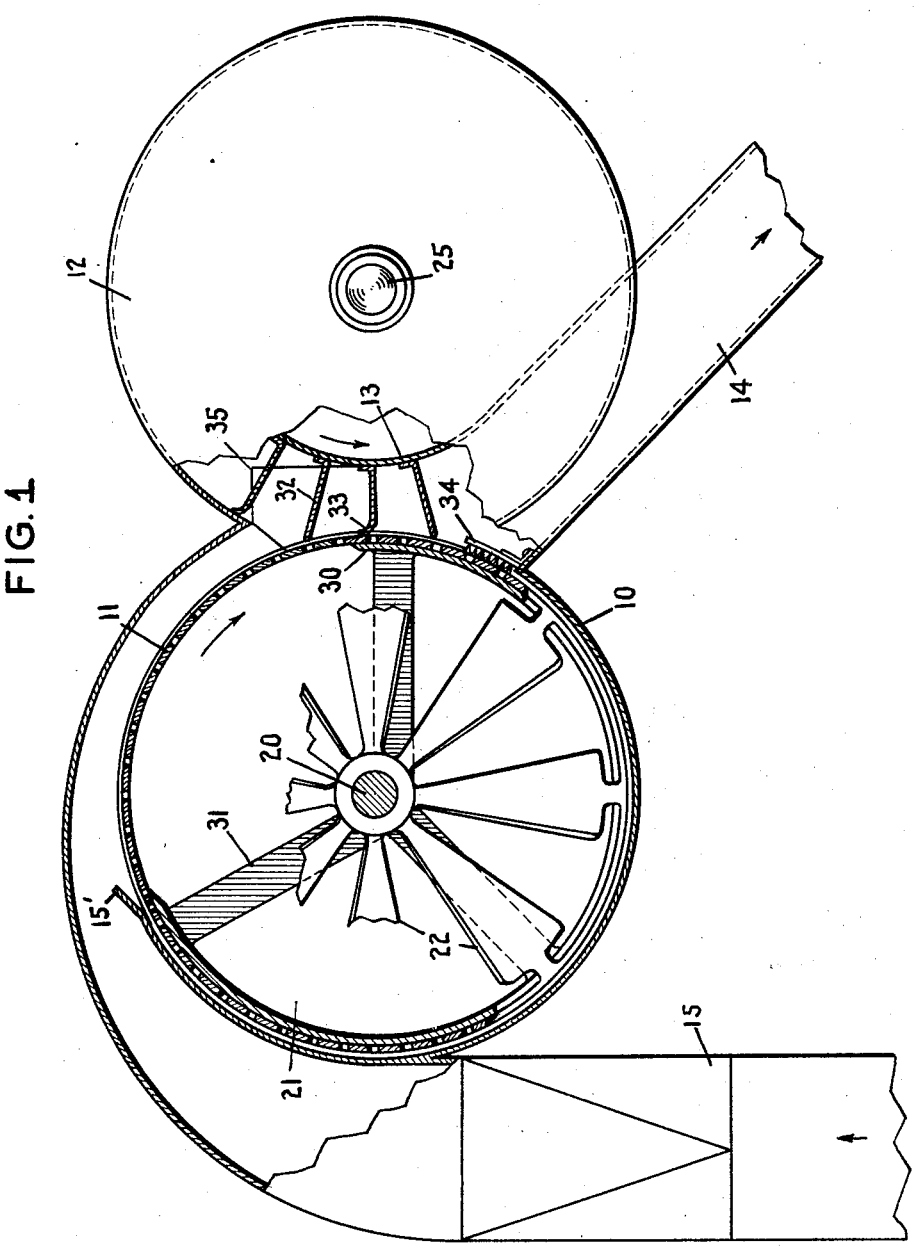
Fig. 1 is a front elevation of the novel lift apparatus with a portion of the casing broken away and a portion of the mechanism shown in vertical section.
Figure 2:
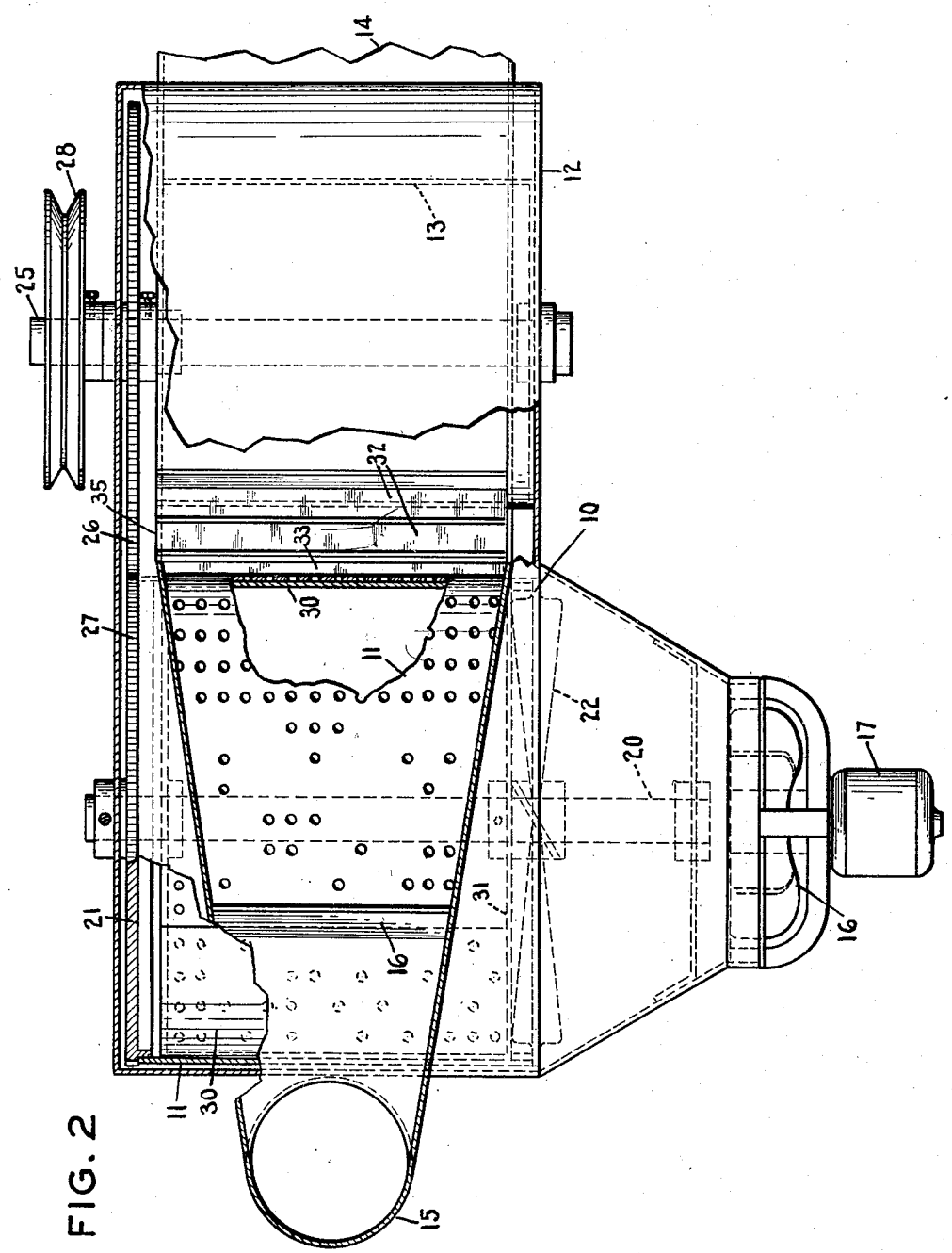
Fig. 2 is a plan view with portions of the casing broken away and a portion of the mechanism shown in horizontal section.

Referring to the drawings, 10 designates a casing for housing a rotatable perforated cylinder 11, and 12 designates a communicating casing for housing a rotatable cylinder 13, both casings being sealed with the exception of a discharge spout or chute 14 therefrom and by which the separated material is to be delivered. The material, such as roasted and cooled coffee beans and which is of light weight, is pneumatically brought to the casing 10; for example, through an uptake duct 15 communicating with the source of supply (not shown).

At its upper end, this duct discharges to the periphery of the cylinder 11 which is at the uppermost portion of its rotation; and provision is made, as through the upturned lip 15' of the inner wall of the duct, to check the velocity of the discharged material and to deflect the material toward the roof of the casing for dropping upon the periphery of cylinder 11. The material thus received by the cylinder is carried along by the same under the action of the suction produced within the cylinder, as by a fan 16 which may be driven by an electric motor or the like 17.

Cylinder 11 is mounted to rotate freely upon a stationary shaft 20 and is closed at its one end by the wall 21 while at its opposite end it has secured thereto a fan member 22 to be rotatable therewith. Under the suction provided, said cylinder may be caused to rotate slowly through the action of the draft of air passing through the cylinder and the fan at its one end.

Correspondingly, the cylinder 13 is mounted for rotation with a shaft 25, and it carries also a gear wheel 26 which is designed to mesh with a similar gear wheel 27 secured to the end wall 21 of the cylinder 11 so that both cylinders will rotate simultaneously with each other, for example, under the driving action of fan 22. Or, a pulley wheel 28 may be secured to the shaft 25 to rotate the two cylinders from some external source of power (not shown) and particularly when the load is heavy.

As hereinbefore stated, the material is held to the periphery of the cylinder 11 under the applied suction, but provision is made to nullify the action of this suction over a predetermined portion of a revolution of the cylinders. To this end, a shield or blocking arcuate shell or cylindrical portion 30 is mounted within the cylinder 11 for contact with its inner surface to thus provide a shield to block off the suction through the various perforations thereof and over an appreciable portion, in the embodiment shown somewhat over 180°. This shell may be secured to the shaft 20 as by means of the spider arms 31.

As soon as the material upon the periphery of the cylinder 11 arrives at the blocked portion, the suction will no longer be effective to retain said material thereto and it drops off and is caught by blades 32 juxtaposed with respect to the periphery of cylinder 11. These blades, for example, may extend radially from the periphery of cylinder 13 and are provided with flexible terminal portions or flaps 33 which wipe over the periphery of cylinder 11 substantially at the point where the shield 30 becomes effective and the material is no longer retained to the periphery of cylinder 11. The said terminal flaps, moreover, serve also as sealing means for the chute to check any back-draft from this source.

The blades 32 also serve during their continued movement to carry the material forward for discharge into the chute 14 from which it is delivered to a dispensing bin or the like (not shown). A brush 34, furthermore, may be mounted at the upper end of the chute for contacting with the periphery of the cylinder 11 to clean its surface and clear the perforations of the said cylinder of any clogging matter.

To obviate any possibility of the material passing through the separator from coming into contact with the meshing gears 26 and 27, walls 35 which are a continuation of the side walls of the chute 14 are arranged to merge with the corresponding walls of the uptake duct 15.

I claim:

1. Pneumatic lift apparatus, comprising an uptake duct, a sealed casing communicating with the upper end of the duct, suction means connected to the casing for lifting material through the duct, a perforated and hollow rotary screen within the casing to receive material from the duct and retain the same to its periphery under the suction applied, a fan element carried by the rotary screen for effecting rotation thereof under the suction produced by the suction means, means associated with the screen to render the suction ineffective thereon over a portion of its rotation and to free thereby the retained material, and means to receive the freed material from the rotary screen.

2. Pneumatic lift apparatus, comprising a housing, an uptake duct communicating at its upper end with the housing, a shaft rigidly mounted in the housing, a cylindrical shell rigidly mounted upon the shaft, a cylinder with perforated wall, closed at one end and rotatably mounted on the shaft about the shell with its inner surface substantially in contact with the periphery thereof, a fan mounted about the shaft and secured to the other end of the perforated cylinder, a second shaft mounted within the housing parallel to the first-named shaft, a cylinder rotatable therewith, gear wheels rotatable with the respective cylinders and meshing with each other, and blades carried by the second-named cylinder adapted to cooperate with the periphery of the perforated cylinder to receive material therefrom.

3. Pneumatic lift apparatus, comprising a housing, an uptake duct communicating at its upper end with the housing, a shaft rigidly mounted in the housing, a cylindrical shell rigidly mounted upon the shaft, a cylinder with perforated wall, closed at one end and rotatably mounted on the shaft about the shell with its inner surface substantially in contact with the periphery thereof, a fan mounted about the shaft and secured to the other end of the perforated cylinder, a second shaft mounted within the housing parallel to the first-named shaft, a cylinder rotatable therewith, gear wheels rotatable with the respective cylinders and meshing with each other, and blades carried by the second-named cylinder having terminal flaps adapted to wipe over the periphery of the perforated cylinder at a portion thereof substantially at the beginning of the inner shell.

4. Pneumatic lift apparatus, comprising a housing, an uptake duct communicating at its upper end with the housing, a shaft rigidly mounted in the housing, a cylindrical shell rigidly mounted upon the shaft, a cylinder with perforated wall, closed at one end and rotatably mounted on the shaft about the shell with its inner surface substantially in contact with the periphery thereof, a fan mounted about the shaft and secured to the other end of the perforated cylinder, a second shaft mounted within the housing parallel to the first-named shaft, a cylinder rotatable therewith, gear wheels rotatable with the respective cylinders and meshing with each other, blades carried by the second-named cylinder, and a delivery chute from the housing and into which the blades discharge material received from the periphery of the perforated cylinder.

In testimony whereof I affix my signature.

HENRY T. MUSTONEN.